Patented Oct. 20, 1953

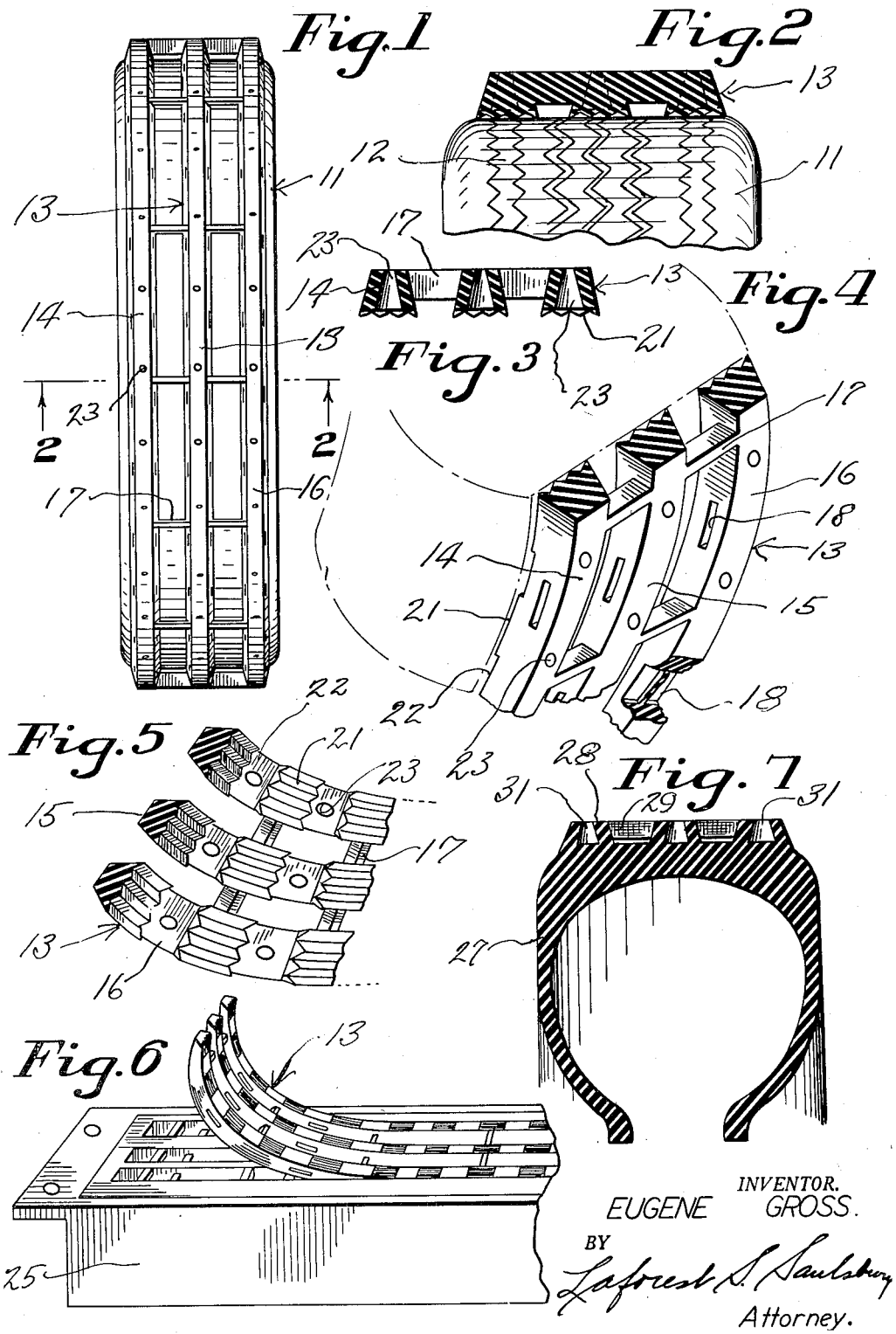

2,655,971

UNITED STATES PATENT OFFICE 2,655,971

ANTISKID DEVICE

Eugene Gross, Brooklyn, N. Y., assignor of one-third to Elizabeth Neufeld, New York, N. Y.

Application February 1, 1949, Serial No. 73,989

5 Claims. (Cl. 152—175)

This invention relates to an automobile tire anti-slip and saving device.

It is an object of the present invention to provide a tire anti-slip and saving device which is so constructed that it can be retained upon the tire of the automobile by the stretching of portions thereof thereover as the tire is inflated, and wherein, when so secured upon the tire of the automobile, the vehicle will, in effect, be supported upon a plurality of tire portions laterally spaced from one another and so that the gripping and traction will, in effect, be that of a multiple number of tires, and wherein in addition to the stretching of the members of the device over the tire to secure the device thereupon, there are serrated faces and suction openings.

It is another object of the present invention to provide a tire anti-slip and saving device which is so constructed that the tire will be kept elevated from the road surface and wherein there is provided fan-like portions adapted to pick up and cause the circulation of air over the actual tire surface to keep it cool during hot weather driving and wherein the device is so constructed that there is little opportunity for the same to become clogged with the mud or snow and which will automatically free itself thereof once the device starts to elevate from the ground surface, and wherein the tire will be kept free of nails and will be made substantially puncture proof.

It is another object of the present invention to provide a new type of tire tread for tires which will provide for adequate ventilation beneath the tire to keep it cool, which will, in effect, have a plurality of riding surfaces, which will ride easier and hold the road better than with tires not having elevated separate and distinct treads.

It is another object of the present invention to provide a rubber-like material adapted for use in making the present anti-skid and tire saving device which has a large proportion of ground glass or the like material incorporated in it for the purpose of providing good gripping action of the material with the ground surface.

Other objects of the present invention are to provide an anti-skid and saving device for automobile tires which is of simple construction, inexpensive to manufacture, easy to apply upon the tire, rugged and will withstand heavy wear, and efficient in operation.

For other objects and for a better understanding of the invention, reference may be had to the following detailed description taken in connection with the accompanying drawing, in which Fig. 1 is an elevational view of a tire having the anti-skid and tire saving device of the present invention secured to it.

Fig. 2 is an enlarged fragmentary and sectional view taken through the device and as viewed on line 2—2 of Fig. 1.

Fig. 3 is a sectional view taken through the device at another location thereon and through the air-receiving and vacuum-gripping openings.

Fig. 4 is an enlarged fragmentary and perspective view of the tire anti-skid device with portions broken away to show the internal construction thereof.

Fig. 5 is a fragmentary perspective view of the device looking into the gripping face thereof.

Fig. 6 is a perspective view of a mold and of a portion of the gripping device being removed from the same prior to the ends of the gripping device being vulcanized together.

Fig. 7 is an enlarged cross-sectional view of a tire having a tread thereon corresponding to the tread which is effected with the anti-skid and tire saving device illustrated in the previous figures.

Referring now particularly to Figs. 1 to 6, 11 represents a tire adapted for use on a vehicle and having the usual tread, as indicated at 12. This tread is adapted to contain an inner tube and to be inflated to expand the outer periphery of the same.

When the tire has been deflated, my device, as indicated generally at 13, can with slight stretching be placed onto the treads of the tire. Thereafter, when the tire has been inflated, my device 13 will be stretched in order that a tight gripping action will be effected by the device upon the tread in order to securely fix the device thereupon against both rotary and lateral displacement.

My device comprises an integral mass formed of three circumferential portions 14, 15 and 16 laterally spaced from each other and held by spacing fins or portions 17 circumferentially spaced about the device. These portions 17 lie flush with the outer peripheries of the laterally spaced portions, but are spaced from the tire tread to allow for the passage of air over the tire tread and about the same to keep the tire cooled during hot weather. These spacing portions serve as blades or fins to pick up the air and to circulate it over the tire tread surface. These fins will keep the tire from overheating.

Each of the laterally spaced portions are of tapered section with a narrow top face and a wide root or bottom face and with inclined sides. Each portion will accordingly act as a separate tire when engaging with the ground and will provide edges for effecting good gripping action into the ground or snow covered surface thereof. With three of these portions, there will be present three side edges adapted to dig into the ground surface to prevent lateral skidding whereas, with the ordinary tire, there is only the one side edge for preventing lateral skidding to one side of the road.

In the sides of each portion are closed slots 18 in order to give cushioning action.

The bottom face of each portion has alternate serrated and plain faces 21 and 22. The serrated faces have the serrations extending longitudinally so as to provide good gripping action into the tire tread to prevent lateral displacement and also to have good gripping or digging in effect to prevent rotational displacement of the device upon the tire. Extending upwardly from the plain faces are tapered openings 23 which are of large diameter at the bottom and which extend upwardly to a smaller diameter at the top and at the outer surface of the portion. Air is admitted into these openings and when the speed of travel of the tire is great, this air will be caught within the opening and will have a vacuum gripping effect upon the portions to make the same cling to the tire and tend to prevent their displacement.

The device is made of stretchable rubber-like material and plastic resins into which there is mixed a high percentage of ground glass filler. This ground glass will give good frictional contact of the material with the ground surface. The device will be stretched as much as three inches about the tire when the tire is inflated. This stretching is about half what the device may be stretched before rupture. The tension on these laterally spaced portions may run up to the neighborhood of 75,000 pounds per square inch. Accordingly, good gripping action of the device with the ground surface and of the device with the tire tread is assured.

The device will be made in a mold part 25, as shown in Fig. 6, and a second mold part not shown adapted to conform to the inner face of the device. A straight strip of the device is made and thereafter this strip can be taken from the mold and the ends of the same vulcanized together.

In Fig. 7, there is shown a composite tire having the tread conforming to the device above described thereon. This tire is shown generally at 27 and has a plurality of integral laterally spaced portions 28 wide at their root and narrow at their outer faces whereby to provide a plurality of edges to prevent skidding and to provide a multiple gripping effect upon the ground surface. These portions are held against lateral displacement by integral spacing strips 29. A suction gripping action is effected by holes 31 circumferentially spaced about the portions 28.

The device will not separate readily from the tire even though the tire is deflated because, when applied to the tire, the tire is deflated and a stretching action is necessary in order that the device be initially placed onto the tire. The tire, when deflated, will stretch considerably the device to hold it in place, but there is sufficient stretch from the initial placing of the device on the tire to retain it on the tire when the tire is deflated.

The tire 27 can be formed either from the standard tire-forming mold or can be formed from a mold adapted for the application of a recapping operation.

While various changes may be made in the detail construction, it shall be understood that such changes shall be within the spirit and scope of the present invention as defined by the appended claims.

What is claimed is:

1. A vehicle tire anti-slip and saving device formed of a plurality of laterally spaced circumferentially extending portions, said portions being adapted to be stretched about the tire upon the tire being inflated, and circumferentially spaced, integral spacing portions connecting the laterally spaced circumferentially extending portions together against relative displacement from one another, and said spacing portions lying between the laterally spaced circumferentially extending portions removed from the inner faces of the circumferentially extending portions whereby to provide a space through which the air may travel along the tire tread in a continuous manner and said integral spacing portions serving as fins for collecting the air while the device with the tire is travelling over the ground surface.

2. A vehicle tire anti-slip and saving device formed of a plurality of laterally spaced circumferentially extending portions, said portions being adapted to be stretched about the tire upon the tire being inflated, and integral spacing portions connecting the laterally spaced circumferentially extending portions together against relative displacement from one another, and said laterally spaced circumferentially extending portions having engaging inner faces for the engagement of the device with the tire tread, each of said circumferentially extending portions having alternate serrated and plain faces to provide good gripping action with the tire tread, the serrated faces having the serrations extending circumferentially.

3. A vehicle tire anti-slip and saving device formed of a plurality of laterally spaced circumferentially extending portions, said portions being adapted to be stretched about the tire upon the tire being inflated, and integral spacing portions connecting the laterally spaced circumferentially extending portions together against relative displacement from one another, and said laterally spaced circumferentially extending portions having engaging inner faces for the engagment of the device with the tire tread, each of said circumferentially extending portions having alternate serrated and plain faces to provide good gripping action with the tire tread, the serrated faces having the serrations extending circumferentially, and said circumferentially extending laterally spaced portions having circumferentially spaced suction openings extending from the inner faces to the exterior faces to collect air and effect upon the device engaging with ground surface a vacuum action of the device upon the tire tread to help maintain the same in place upon the tire tread, said openings being of wide diameter at the inner face of the portions and of less diameter on the ground-engaging face.

4. A tire having a plurality of laterally spaced circumferentially extending elevated portions completely surrounding the tire and providing a plurality of anti-skid gripping edges, the spaces between the portions being sufficient to prevent the portions from picking up mud or snow, integral circumferentially spaced spacing portions extending between the laterally spaced circumferentially extending portions to prevent the lateral displacement of said portions with respect to one another, said spacing portions separated from one another in a circumferential direction of sufficient distance to avoid simultaneous contact of circumferentially contiguous spacing portions with the ground when in use, said spacing portions being elevated from the roots of the raised laterally spaced circumferentially extending portions to permit the circulation of air about the periphery of the tire, said integral spacing portions serving to receive and collect air and to maintain the ventilation of such air over the tire surface.

5. A tire having a plurality of laterally spaced circumferentially extending elevated portions completely surrounding the tire and providing a plurality of anti-skid gripping edges, the spaces between the portions being sufficient to prevent the portions from picking up mud or snow, integral circumferentially spaced spacing portions extending between the laterally spaced circumferentially extending portions to prevent the lateral displacement of said portions with respect to one another, said spacing portions being elevated from the roots of the raised laterally spaced circumferentially extending portions to permit the circulation of air about the periphery of the tire, said integral spacing portions serving to receive and collect air and to maintain the ventilation of such air over the tire surface, said circumferentially extending portions having circumferentially spaced openings for receiving air and for effecting a vacuum gripping action with the ground surface.

EUGENE GROSS.

References Cited in the file of this patent

UNITED STATES PATENTS

| Number | Name | Date |
|---|---|---|
| 650,907 | Pope | June 5, 1900 |
| 1,609,644 | Darling | Dec. 7, 1926 |
| 2,345,518 | Wendel | Mar. 28, 1944 |

FOREIGN PATENTS

| Number | Country | Date |
|---|---|---|
| 5,005 | Great Britain | 1895 |
| 65,225 | Norway | Sept. 14, 1942 |
| 503,029 | France | June 1, 1920 |